(12) United States Patent
Williams et al.

(10) Patent No.: US 12,731,410 B2
(45) Date of Patent: Sep. 8, 2026

(54) METHODS AND APPARATUS TO TRACK AND CLASSIFY OBJECTS

(71) Applicant: Insitu, Inc., Bingen, WA (US)

(72) Inventors: Brendan Patrick Williams, Brisbane (AU); Alexander Lloyd Wainwright, Brisbane (AU); Nikaela Lea Podolsky, Brisbane (AU); Jasmin Florence Martin, Moorooka (AU); Seren Riseley, Brisbane (AU); Jason John Ford, Brisbane (AU)

(73) Assignee: Insitu, Inc., Bingen, WA (US)

( * ) Notice: Subject to any disclaimer, the term of this patent is extended or adjusted under 35 U.S.C. 154(b) by 227 days.

(21) Appl. No.: 18/492,298

(22) Filed: Oct. 23, 2023

(65) Prior Publication Data

US 2025/0131732 A1 Apr. 24, 2025

(51) Int. Cl.

| | |
|---|---|
| ***G06V 20/58*** | (2022.01) |
| ***B64D 45/08*** | (2006.01) |
| ***G06T 7/20*** | (2017.01) |
| ***G06T 7/70*** | (2017.01) |
| ***G06V 10/764*** | (2022.01) |
| ***G06V 10/774*** | (2022.01) |
| ***G08G 5/72*** | (2025.01) |
| ***G08G 5/80*** | (2025.01) |

(52) U.S. Cl.

CPC ............ *G06V 20/58* (2022.01); *B64D 45/08* (2013.01); *G06T 7/20* (2013.01); *G06T 7/70* (2017.01); *G06V 10/764* (2022.01); *G06V 10/774* (2022.01); *G08G 5/723* (2025.01); *G08G 5/80* (2025.01); *G06T 2207/10032* (2013.01); *G06T 2207/20081* (2013.01); *G06T 2207/30252* (2013.01)

(58) Field of Classification Search

CPC .... G06V 10/774; G06V 10/764; G06V 20/58; G06V 20/13; G06V 20/17; G08G 5/80; G08G 5/723; G06T 7/70; G06T 7/20; G06T 2207/30252; G06T 2207/10032; G06T 2207/20081; B64D 45/08

See application file for complete search history.

(56) References Cited

PUBLICATIONS

Dolph, Chester V., et al. “Adversarial Learning Improves Vision-Based Perception from Drones with Imbalanced Datasets.” Journal of Aerospace Information Systems Aug. 2023;20(8):489-507. (Year: 2023).*

(Continued)

*Primary Examiner* — Tracy Mangialaschi
(74) *Attorney, Agent, or Firm* — Hanley, Flight & Zimmerman, LLC

(57) ABSTRACT

Methods and apparatus are disclosed to track and classify objects. An example apparatus for use with an aircraft includes interface circuitry communicatively coupled to an image sensor, the image sensor to capture images, machine readable instructions, and programmable circuitry to at least one of instantiate or execute the machine readable instructions to pre-process the images to identify potential targets, filter, based on the identified potential targets, at least one of the images to determine a presence of a persistent object therein, characterize a looming characteristic of the persistent object, and classify the persistent object based on the looming characteristic meeting or exceeding a looming characteristic threshold.

23 Claims, 10 Drawing Sheets

(56) References Cited

PUBLICATIONS

Dolph, Chester V., et al. "Detection and tracking of aircraft from small unmanned aerial systems." Journal of Aerospace Information Systems 18.11 (2021): 838-851. (Year: 2021).*

Mejias Alvarez, Luis, Mcnamara, Scott, Lai, John, & Ford, Jason (2010) Vision-based detection and tracking of aerial targets for UAV collision avoidance. In Luo, R C & Asama, H (Eds.) Proceedings of the IEEE/RSJ 2010 International Conference on Intelligent Robots and Systems (IROS 2010). Institute of Electrical and Electronics Engineers Inc., United States, pp. 87-92.

Lai, John & Ford, Jason (2010) Relative entropy rate based on multiple hidden Markov model approximation. IEEE Transactions on Signal Processing, 58(1), pp. 165-174.

Lai, John, Mejias Alvarez, Luis, & Ford, Jason (2011) Airborne vision-based collision-detection system. Journal of Field Robotics, 28(2), pp. 137-157.

Lai, John, Ford, Jason, Mejias Alvarez, Luis, O'Shea, Peter, & Walker, Rodney (2011) Detection versus false alarm characterisation of a vision-based airborne dim-target collision detection system. In Gal, Y, Bradley, A, Jackway, P, & Salvado, O (Eds.) Proceedings of the 2011 International Conference on Digital Image Computing: Techniques and Applications. Institute of Electrical and Electronics Engineers Inc., Australia, pp. 448-455.

Mejias Alvarez, Luis, Lai, John, Ford, Jason, & O'Shea, Peter (2012) Demonstration of closed-loop airborne sense-and-avoid using machine vision. IEEE Aerospace and Electronic Systems Magazine, 27(4), pp. 4-7.

Lai, John, Ford, Jason, Mejias Alvarez, Luis, Wainwright, Alexander, O'Shea, Peter, & Walker, Rodney (2012) Field-of-view, detection range, and false alarm trade-offs in vision-based aircraft detection. In Grant, I (Ed.) Proceedings of the 28th Congress of the International Council of the Aeronautical Sciences. Optimage Ltd. / International Council of the Aeronautical Sciences, United Kingdom, pp. 1-8.

Mejias Alvarez, Luis, Lai, John, & Ford, Jason (2012) Flight trial of an electro-optical sense-and-avoid system. In Grant, I (Ed.) Proceedings of the 28th Congress of the International Council of the Aeronautical Sciences. Optimage Ltd. / International Council of the Aeronautical Sciences—ICAS, United Kingdom, pp. 1-7.

Lai, John, Ford, Jason, Mejias Alvarez, Luis, O'Shea, Peter, & Walker, Rodney (2012) See and avoid using onboard computer vision. In Plamen, A (Ed.) Sense and Avoid in UAS: Research and Applications. John Wiley & Sons, United States, pp. 265-294.

Lai, John, Ford, Jason, Mejias Alvarez, Luis, & O'Shea, Peter (2013) Characterization of sky-region morphological-temporal airborne collision detection. Journal of Field Robotics, 30(2), pp. 171-193.

Molloy, T., Ford, J., & Mejias Alvarez, L. (2014). Looming aircraft threats: shape-based passive ranging of aircraft from monocular vision. In Proceedings of the 16th Australasian Conference on Robotics and Automation 2014 (pp. 1-10). Australian Robotics and Automation Association (ARAA).

Wilson, Michael, Ryan, Daniel, Bratanov, Dmitry, Wainwright, Alexander, Ford, Jason, Cork, Lennon, et al. (2016) Flight test and evaluation of a prototype sense and avoid system onboard a ScanEagle unmanned aircraft. IEEE Aerospace and Electronic Systems Magazine, 31(9), pp. 6-15.

Mejias Alvarez, Luis, Mcfadyen, Aaron, & Ford, Jason (2016) Sense and avoid technology developments at Queensland University of Technology. IEEE Aerospace and Electronic Systems Magazine, 31(7), pp. 28-37.

Bratanov, Dmitry, Mejias Alvarez, Luis, & Ford, Jason (2017) A vision-based sense-and-avoid system tested on a ScanEagle UAV. In Chen, Y J, Lozano, R, & Tsourdos, A (Eds.) Proceedings of the 2017 International Conference on Unmanned Aircraft Systems. Institute of Electrical and Electronics Engineers Inc., United States of America, pp. 1134-1142.

James, Jasmin, Ford, Jason, & Molloy, Timothy (2019) Quickest detection of intermittent signals with application to vision-based aircraft detection. IEEE Transactions on Control Systems Technology, 27(6), Article No. 84901122703-2710.

Ford, Jason, James, Jasmin, & Molloy, Timothy (2020) On the informativeness of measurements in Shiryaev's Bayesian quickest change detection. Automatica, 111, Article No. 108645.

Martin, J., Riseley, J., & Ford, J. J. (2022) A Dataset of Stationary, Fixed-wing Aircraft on a Collision Course for Vision-Based Sense and Avoid. In Proceedings of the 2022 International Conference on Unmanned Aircraft Systems (ICUAS). Institute of Electrical and Electronics Engineers Inc., United States of America, pp. 144-149.

* cited by examiner

METHODS AND APPARATUS TO TRACK AND CLASSIFY OBJECTS

FIELD OF THE DISCLOSURE

This disclosure relates generally to tracking objects and, more particularly, methods and apparatus to track and classify objects with an image sensor system.

BACKGROUND

Image sensor systems typically include an image sensor to record and/or capture video images. In known implementations, an image sensor system of a vehicle can identify objects in the line of sight of the vehicle. Such identification can be used for determining whether objects in the line of sight of the vehicle require user intervention of the vehicle or adjusting a path of the vehicle to avoid the object.

SUMMARY

Examples disclosed herein include an apparatus for use with an aircraft, the apparatus comprising interface circuitry communicatively coupled to an image sensor, the image sensor to capture images, machine readable instructions, and programmable circuitry to at least one of instantiate or execute the machine readable instructions to pre-process the images to identify potential targets, filter, based on the identified potential targets, at least one of the images to determine a presence of a persistent object therein, characterize a looming characteristic of the persistent object, and classify the persistent object based on the looming characteristic meeting or exceeding a looming characteristic threshold.

Additional examples include a non-transitory machine readable storage medium comprising instructions to cause programmable circuitry to at least pre-process an image to identify potential targets, filter, based on the identified potential targets, at least one of the images to determine a presence of a persistent object therein, characterize a looming characteristic of the persistent object, and classify the persistent object based on the looming characteristic meeting or exceeding a looming characteristic threshold.

Additional examples include a method comprising pre-processing, by executing instructions with processor circuitry, an image to identify potential targets, filtering, by executing instructions with the processor circuitry, at least one of the images based on the identified potential targets to determine a presence of a persistent object therein, characterizing, by executing instructions with the processor circuitry, a looming characteristic of the persistent object, and classifying, by executing instructions with the processor circuitry, the persistent object based on the looming characteristic meeting or exceeding a looming characteristic threshold.

BRIEF DESCRIPTION OF THE DRAWINGS

In general, the same reference numbers will be used throughout the drawing(s) and accompanying written description to refer to the same or like parts. The figures are not necessarily to scale.

Figure 1:
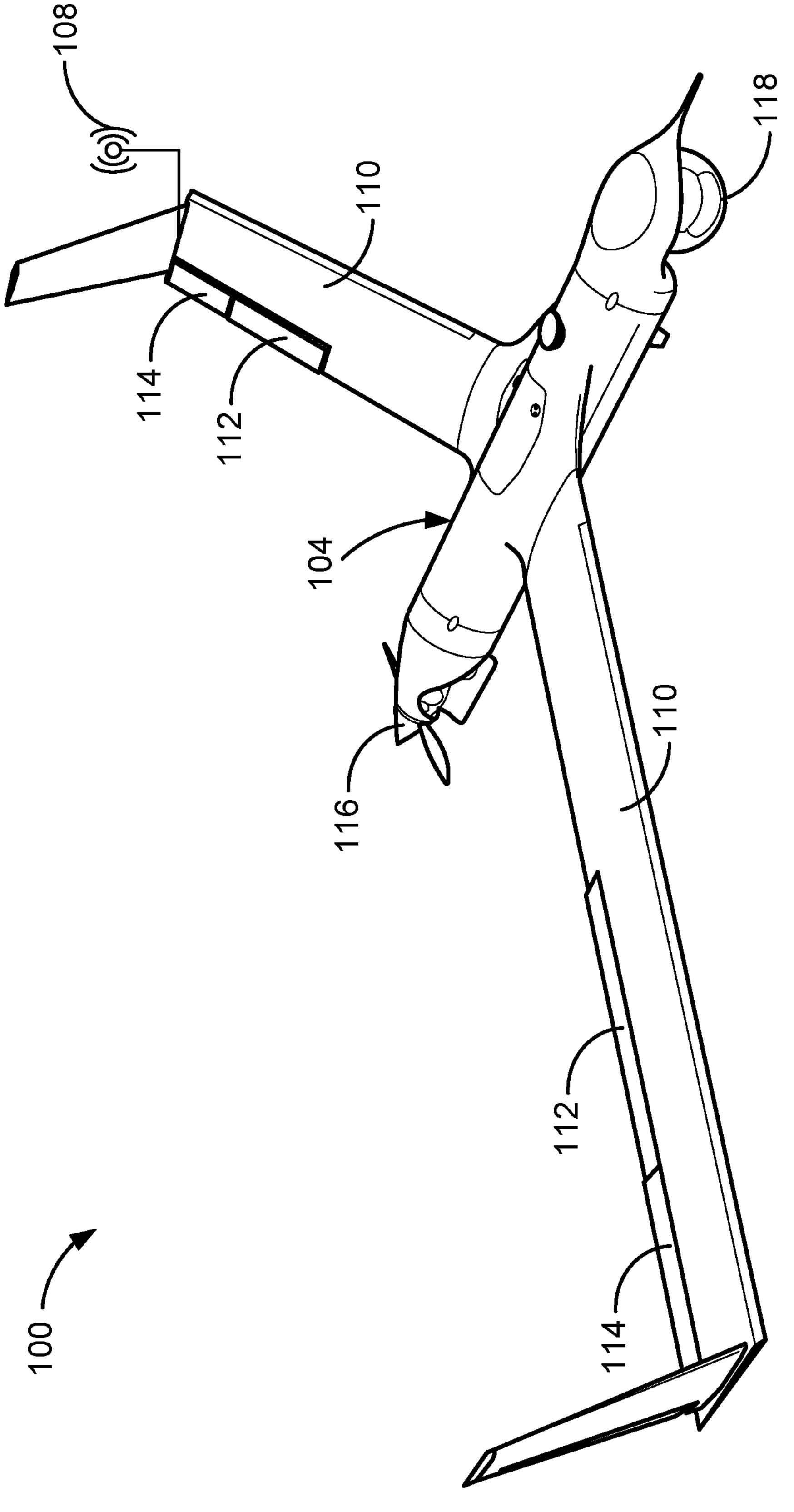
FIG. 1 is an example platform in which examples disclosed herein can be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, "run-time" refers to the operation of a computing system within a defined execution cycle. Computing systems that typically operate within a continuous execution cycle are referred to herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

DETAILED DESCRIPTION

Typical image sensor/detection systems can necessitate relatively heavy and bulky radar systems for detecting and/or tracking objects. On vehicle platforms, including aerial vehicle platforms, weight and size can significantly impact performance of a vehicle. Accordingly, the weight and size typically associated with a radar system can negatively impact the performance of the vehicle. For relatively smaller vehicles, a radar system may not be a feasible solution due to the size and weight of such systems.

Some image sensor systems include artificial intelligence (AI)/machine learning (ML) models that use blob detection (e.g., a field of a plurality of pixels) to enable the AI/ML models to have sufficient data for decision-making. Such blob detection can necessitate an increased number of images/video to be captured by the image sensor system and can also necessitate an object to be in the line of sight of the vehicle for a relatively long time, thereby delaying the determination of when the object is a threat to the vehicle. Further, increased data requirements to process an image or video to detect object can increase weight by requiring increases in storage and processing. Image sensor filtering and processing requirements can also increase size, weight, and power (SWaP) requirements of a vehicle.

Examples disclosed herein utilize an image sensor system to detect, track, and classify objects within a line of sight of a vehicle. Disclosed methods, apparatus, and systems utilize image stabilization, image pre-processing, temporal filtering, and an object tracker/classifier for identification of potential threats to the vehicle. Examples disclosed herein calculate looming characteristics of objects to identify potential threats. Some examples disclosed herein utilize a machine learning model to track and classify potential threats in a relatively quick manner, thereby enabling reduced SWaP requirements in comparison to known image sensor systems.

FIG. 1 is an example platform 100 in which examples disclosed herein can be implemented. In the example of FIG. 1, the platform 100 includes an unmanned aerial vehicle (UAV) 104 with a transceiver 108. Although the example of FIG. 1 depicts a UAV, the example platform 100 could be any other vehicle or movable platform including, but not limited to, manned aircraft, remote control (RC) vehicles, automobiles, water vessels such as boats, submarines, etc.

The example UAV 104 includes at least one lifting surface 110. In particular, the lifting surface 110 enables the UAV 104 to achieve flight by opposing a weight force of the UAV 104. In the example platform 100 of FIG. 1, the UAV 104 includes two lifting surfaces 110. It should be understood that other configurations can be implemented instead of lifting surfaces. It should also be understood that other non-aerial vehicle platforms do not include lifting surfaces (e.g., a quadcopter).

The UAV 104 also includes control surfaces 112, 114 and a propulsion system 116. The control surfaces 112 of the example of FIG. 1 are flaps to alter aerodynamic properties of the lifting surfaces 110 by increasing a camber of the lifting surfaces 110 (e.g., increasing a lift force on the lifting surfaces 110) and/or increasing a drag force on the UAV 104. The control surfaces 114 of the example of FIG. 1 are ailerons to change a rolling moment of the UAV 104. Varying the rolling moment of the UAV 104 allows horizontal and vertical control of the UAV 104 (e.g., changing heading and altitude). It should be understood that while only two control surfaces 112, 114 are shown in FIG. 1, additional control surfaces may be included to alter forces and moments about the axis of the vehicle. The propulsion system 116 is a propeller which provides a thrust force to the UAV 104 (e.g., opposing a drag force). In other example platforms, the propulsion system 116 includes, but is not limited to a reciprocating engine, a turbine, an electric motor, etc.

The UAV 104 of FIG. 1 also includes an image sensor system 118. In the example of FIG. 1, the image sensor system 118 is a camera capable of recording video and/or images.

In some examples, the control surfaces 112, 114, the propulsion system 116, and the image sensor system 118 communicate with circuitry on the UAV 104 for controlling such systems/surfaces. In examples disclosed herein, the circuitry, and hence the control surfaces 112, 114, the propulsion system 116, and the image sensor system 118 are communicatively coupled with the transceiver 108 (or other communication equipment) to send/receive information/instructions.

Figure 2:
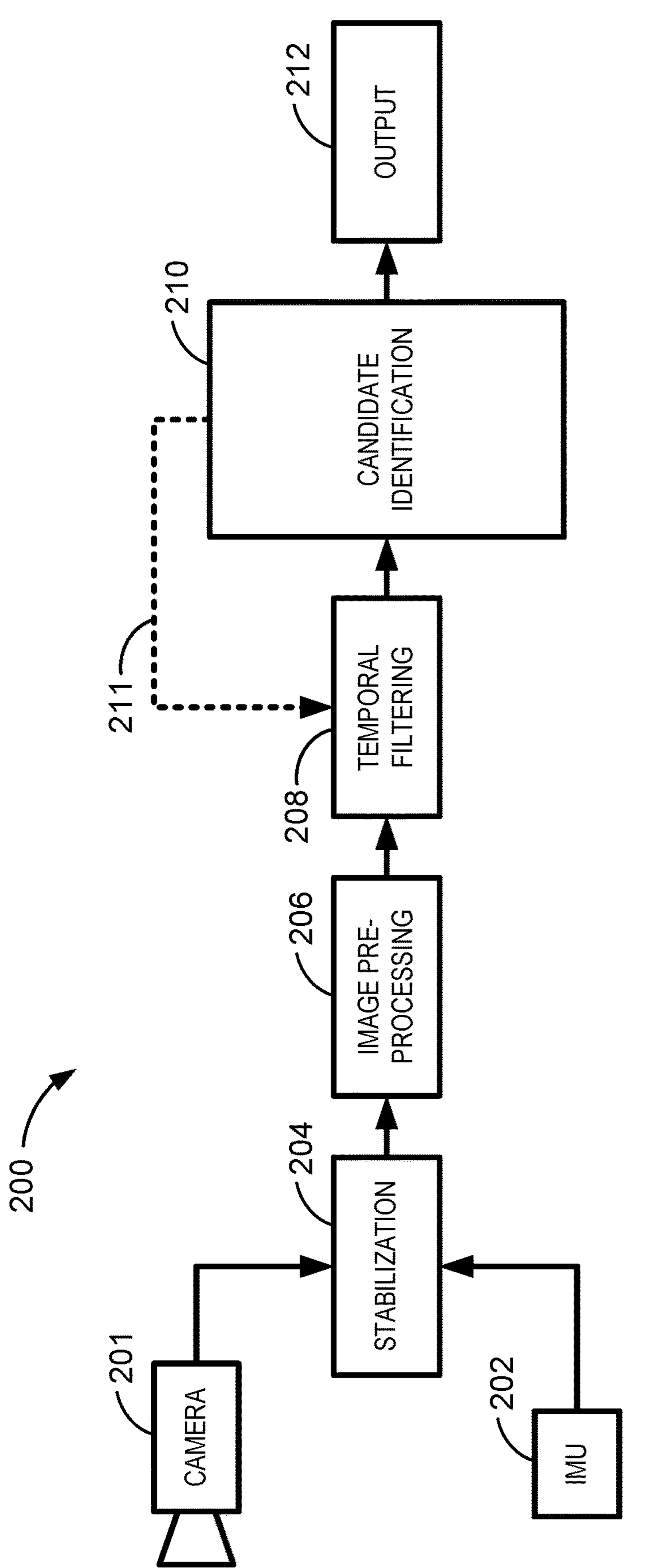
FIG. 2 is a block diagram of an example process flow to track and classify objects in accordance with teachings of this disclosure.

FIG. 2 is a block diagram of an example process flow 200 to track and classify objects in accordance with teachings of this disclosure. The example process flow 200 can be implemented by the example image sensor system 118 of FIG. 1. The example process flow 200 is depicted with an image sensor (e.g., a camera) 201 and an inertial measurement unit (IMU) 202. The example process flow 200 includes a stabilization operation 204, an image pre-processing operation 206, a temporal filtering operation 208, and a candidate identification operation 210, all of which are implemented to provide an output 212.

Figure 3:
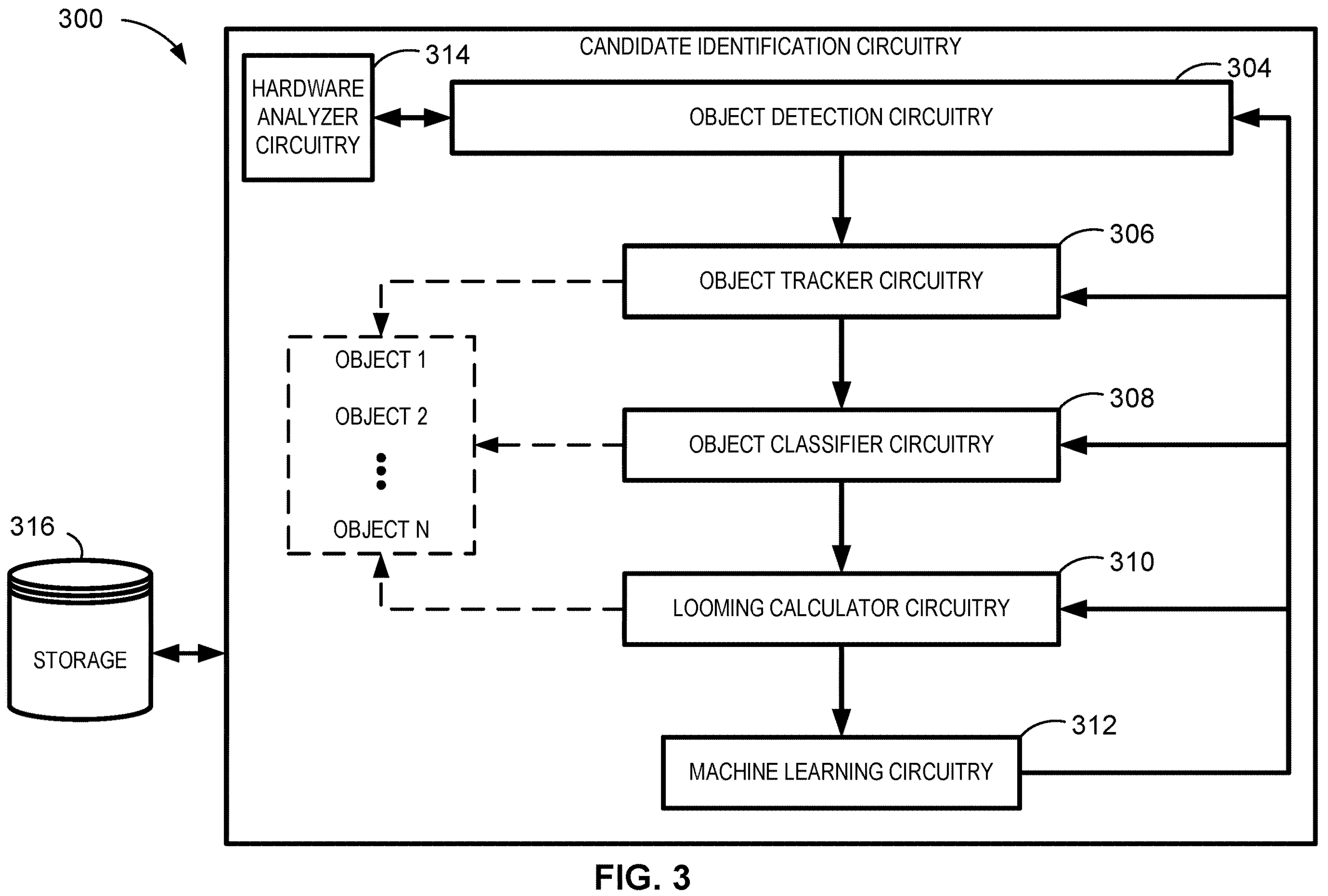
FIG. 3 is a block diagram of an example analysis system in accordance with teachings of this disclosure to track and classify objects.

The example image sensor 201 of FIG. 2 is any camera capable of capturing images and/or video. In some examples, the image sensor 201 is communicatively coupled to a storage device (e.g., a storage device 316 as shown in FIG. 3) to store the images/video from the image sensor 201. In some examples, the image sensor 201 captures the images/video substantially in real-time and an analysis of the images/video is performed substantially in real-time with the capturing of the images/video (e.g., the images/video are not stored on a storage device for subsequent access).

The example IMU 202 measures inertial forces being applied to the vehicle (e.g., the UAV 104). The inertial forces can include velocity components in 3 orthogonal axes (e.g., an x, y, and z-axis), acceleration components in the 3 orthogonal axes, moments corresponding to the 3 orthogonal axes, etc. The measurement of these inertial forces are used to not only stabilize the UAV 104 during an auto-pilot scenario but are also used to stabilize the image sensor 201 and/or stabilize images/video captured by the image sensor 201. Examples of an IMU to stabilize camera movements include a gimbal. However, any other stabilization device or technique can be implemented instead.

At the example stabilization operation 204, the images/video captured by the image sensor 201 are stabilized. In some examples, stabilization is performed by utilizing an algorithm that processes the images/video from the image sensor 201 and provides an output representing a stabilized image/video from the image sensor 201 (e.g., a stabilized image with reduced bobbing, vibration, etc.). Stabilization of the image/video can ensure that any objects that are to be detected within the image/video are clearly identifiable and not subject to errors based on movement of the image sensor 201.

At the example image pre-processing operation 206, the stabilized image/video from the stabilization operation 204 is pre-processed to identify potential targets within the image/video for further processing. In some examples, at the image pre-processing operation 206, the stabilized image/video is analyzed to identify pixels within the image/video in which a target may exist. According to examples disclosed herein, a reduction of identifying potential targets from a blob (e.g., a cluster of pixels) to a single pixel can reduce computation time and resources needed to process an image/video. This enables identification of potential targets relatively quicker than known systems by reducing a need to process a blob prior to identifying the cluster of pixels (e.g., a blob) as a potential target. In some examples, morphological processing (e.g., processing an image based on shapes identified in the image) is utilized to highlight and/or indicate potential pixel-sized targets that contrast with the background.

At the temporal filtering operation 208, indications of potential targets from the image pre-processing operation 206 are received and a filtering operation is performed on the image/video (based on the indication of the potential target) to identify whether the potential target/object can be classified as a threat. In some examples, a Hidden Markov Model (HMM) is utilized to determine whether a potential target can be classified as a threat. In some such examples, HMM filtering is used to extract potential pixel sized targets that exhibit similar motion to an aircraft. In some examples, HMM filtering is used to extract potential pixel sized targets that maintain a relatively constant bearing (e.g., along a direction of travel relative to the ground or some other fixed reference point). In some examples, whether the object detected is persistent within the image/video is determined for warranty trigger and/or filtering of the object. In such an example, a persistence threshold may be utilized such that if an object is detected in frames/images that exceed a threshold number of frames/images, the temporal filtering operation 208 identifies and/or classifies the object as a threat. In some examples, the persistence threshold is determined utilizing a Bayesian approach that considers both an intensity (e.g., speed, size, mass, etc.) of the object in a current frame as well as anticipated motions of the object based on analysis of a previous frame (e.g., recursive to anticipate/predict/calculate on each new frame based on previous frames).

In examples disclosed herein, an object can be classified as a threat based on an increased probability of the object being a hazard/danger to the vehicle (e.g., the UAV 104). Such a potential hazard/danger can include non-cooperative traffic such as birds or any other kinds of animals, humans, other vehicles that do not or are not utilizing a communication feature for communicating outside of the vehicle, etc. Examples disclosed herein can effectively and efficiently identify hazards/dangers, thereby reducing a need for the vehicle to rely on a communication protocol for communicating with other vehicles/objects and/or threat identification equipment/devices that can add significant cost and weight.

According to examples disclosed herein, at the candidate identification operation 210, objects classified as threats are identified via the temporal filtering operation 208. In examples disclosed herein, tracking the objects includes allocating computing and/or image processing resources to maintain a visual sight (e.g., sight lock) of an object (e.g., maintaining the image sensor 201 oriented toward to the object, continually monitoring the object to further determine a threat level, performing automated maneuvers to avoid the object, communicating a presence/image of the object, etc.).

In examples disclosed herein, classifying the threat can include identifying a looming characteristic (e.g., a category, threshold, etc.). For example, at the temporal filtering operation 208, a plastic bag floating in the air and a bird in the sky may be identified as a threat with temporal filtering alone. However, the candidate identification operation 210 can classify these objects and categorize them and/or assign different looming thresholds to the objects to identify an action to take such as enabling a non-threat object to get closer to the UAV 104 before performing any action or increasing a time delay to perform an action. According to examples disclosed herein, the aforementioned plastic bag may not necessitate intervention because it is unlikely to cause harm to the vehicle while the bird may require intervention based on the bird's weight or size, for example.

In some examples, a threat may be classified as a point like object, that persists in time, and maintains a relatively constant bearing. In some examples, a threat may be classified as a point-like object, that persists in time, maintains a constant bearing, and additionally exhibits looming characteristics. In some examples, a threat may be classified as a point-like object, that persists in time, maintains a constant bearing, and is additionally identified by a low level deep neural network/machine learning model for image classification (e.g., utilizing an optimized spatial classifier) as a hazard. However, any other appropriate criteria for classification of a thread can be implemented instead.

In some examples, during the candidate identification operation 210, at least one additional filtering operation is performed on the detected object. This filtering operation can be performed when an object is no longer classified as a threat. In such an example, the object can be re-filtered (e.g., corresponding to line 211 in FIG. 2) and removed and/or ignored from further processing based on the object no longer being deemed a threat.

The example output 212 can pertain to information regarding the objects detected and classified. In some examples, the information is transmitted to a user and/or operator/pilot. In some examples, information is stored on the storage device 316. In some examples, the output 212 corresponds to indications (e.g., cautions, warnings, etc.), sensor data, control override commands (e.g., automatic control surface 112, 114 adjustments, propulsion system 116 adjustments, etc.), an output from the candidate identification operation 210, or any other appropriate information.

FIG. 3 is a block diagram of an example candidate identification circuitry 300 that can be implemented in examples disclosed herein. The candidate identification circuitry 300 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the candidate identification circuitry 300 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example candidate identification circuitry 300 of FIG. 3 includes example object detection circuitry 304, example object tracker circuitry 306, example object classifier circuitry 308, example looming calculator circuitry 310, example machine learning circuitry 312, and example hardware analyzer circuitry 314. In some examples, the candidate identification circuitry 300 includes the aforementioned data storage 316.

In the illustrated example of FIG. 3, the object detection circuitry 304 determines how many objects have been detected as well as classified as a threat. In some examples, the object detection circuitry 304 generates and/or defines a unique tracker and classifier for each object detected as a threat and allocates computational resources to track and classify each object independently. In some examples, the object detection circuitry 304 is limited in how many objects to track and classify based on the analysis of the hardware from the hardware analyzer circuitry 314.

The example object tracker circuitry 306 tracks each object classified as a threat. In examples disclosed herein, the object tracker circuitry 306 tracks each object classified as a threat in a relatively simultaneous manner such that the object tracker circuitry 306 can track multiple objects at once.

The example object classifier circuitry 308 classifies the objects being tracked by the example object tracker circuitry 306. The object classifier circuitry 308 classifies each object in a relatively simultaneous manner. If an object is being simultaneously tracked, that object can also be simultaneously classified. As mentioned above, classifying objects includes determining a severity or a threat level of the object based on a category in which the object may fall into.

The example looming calculator circuitry 310 of the illustrated example of FIG. 3 calculates looming characteristics for each object being tracked and classified. In some examples, looming characteristics include a looming threshold, placing a weight (e.g., an importance/emergency factor) on the object based on a category of the object (e.g., a different weight may be assigned to a floating bag versus a bird or another vehicle), etc. In some examples, when an object is being tracked and classified, the looming threshold is used to identify and/or select an emergency response (e.g., evasive maneuvers, transmit an emergency indication via the transceiver 108, etc.). In some examples, the looming threshold is constant (e.g., fixed, pre-determined, etc.). Such an example can reduce requirements of computational resources for tracking and/or classifying objects since the looming threshold is not continuously updated/determined.

In some examples, the looming characteristics are modified (e.g., thresholds are changed, category of the object, etc.) in substantially real time. In such examples, the looming characteristics can be classified and/or characterized by the category in which the object is placed, the looming threshold, or any other appropriate characteristic, such looming characteristics that can be modified to represent the current operating condition of the UAV 104 and/or the current state of the identified object.

In some examples, the candidate identification circuitry 300 includes example machine learning circuitry 312 to train and deploy/utilize a machine learning model. In such examples, the machine learning circuitry 312 trains and deploys a machine learning model to the example object detection circuitry 304, the example object tracker circuitry 306, the example object classifier circuitry 308, and/or the example looming calculator circuitry 310. In some examples, the machine learning model is initially trained with data to assist the example object detection circuitry 304 to reduce a time needed to classify an object as a threat or to decrease a likelihood that a false threat is passed to the example object tracker circuitry 306 and onward.

In some examples, the machine learning model is trained with data identifying common objects (e.g., birds, aircraft, humans, etc.) for detection and assigns a pre-defined classification to those objects. In such examples, computational resource requirements can be reduced to classify an object that is being tracked and can result in actions being performed relatively quicker to avoid such objects.

In some examples, the machine learning model is trained with information/data collected by the example object detection circuitry 304, the example object tracker circuitry 306, the example object classifier circuitry 308, and/or the example looming calculator circuitry 310 to relatively reduce subsequent detection, tracking, classifying, and calculating times that occur when a threat is detected. In examples disclosed herein, the machine learning circuitry 312 continually trains and deploys the machine learning model.

The hardware analyzer circuitry 314 analyzes hardware capabilities within the candidate identification circuitry 300. In some examples, the candidate identification circuitry 300 is limited in computational resources available based on the platform 100 (e.g., based on central processing unit (CPU) resources available, random access memory (RAM) available, graphical processing unit (GPU) resources available, transfer speeds, etc.). As such, a number of objects that can be tracked and classified may be limited based on the hardware capabilities. Therefore, the hardware analyzer circuitry 314 can determine the limit by analyzing the hardware either during run-time or on boot.

While an example manner of implementing the candidate identification circuitry 300 of FIG. 3 is illustrated in FIG. 3, one or more of the elements, processes, and/or devices illustrated in FIG. 3 may be combined, divided, re-arranged, omitted, eliminated, and/or implemented in any other way. Further, the example object detection circuitry 304, example object tracker circuitry 306, example object classifier circuitry 308, example looming calculator circuitry 310, example machine learning circuitry 312, and example hardware analyzer circuitry 314, and/or, more generally, the example candidate identification circuitry 300 of FIG. 3, may be implemented by hardware alone or by hardware in combination with software and/or firmware. Thus, for example, any of the example object detection circuitry 304, example object tracker circuitry 306, example object classifier circuitry 308, example looming calculator circuitry 310, example machine learning circuitry 312, and example hardware analyzer circuitry 314, and/or, more generally, the example candidate identification circuitry 300, could be implemented by programmable circuitry in combination with machine readable instructions (e.g., firmware or software), processor circuitry, analog circuit(s), digital circuit (s), logic circuit(s), programmable processor(s), programmable microcontroller(s), graphics processing unit(s) (GPU (s)), digital signal processor(s) (DSP(s)), ASIC(s), programmable logic device(s) (PLD(s)), and/or field programmable logic device(s) (FPLD(s)) such as FPGAs. Further still, the example candidate identification circuitry 300 of FIG. 3 may include one or more elements, processes, and/or devices in addition to, or instead of, those illustrated in FIG. 3, and/or may include more than one of any or all of the illustrated elements, processes and devices.

Figure 4:
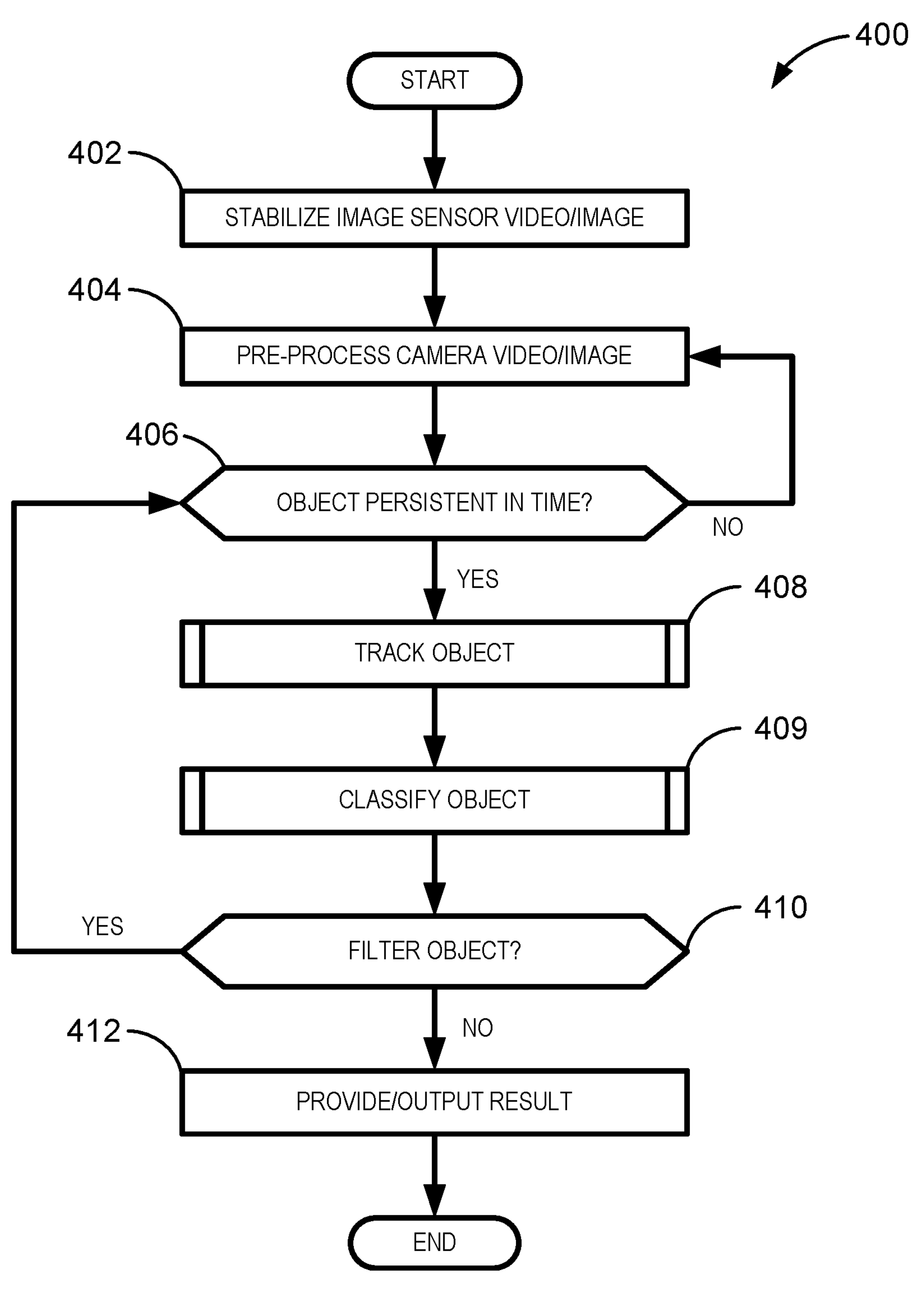
FIGS. 4-6 are flowcharts representative of example machine readable instructions and/or example operations that may be executed, instantiated, and/or performed by example programmable circuitry to implement the candidate identification circuitry of FIG. 3.
Figure 5A:
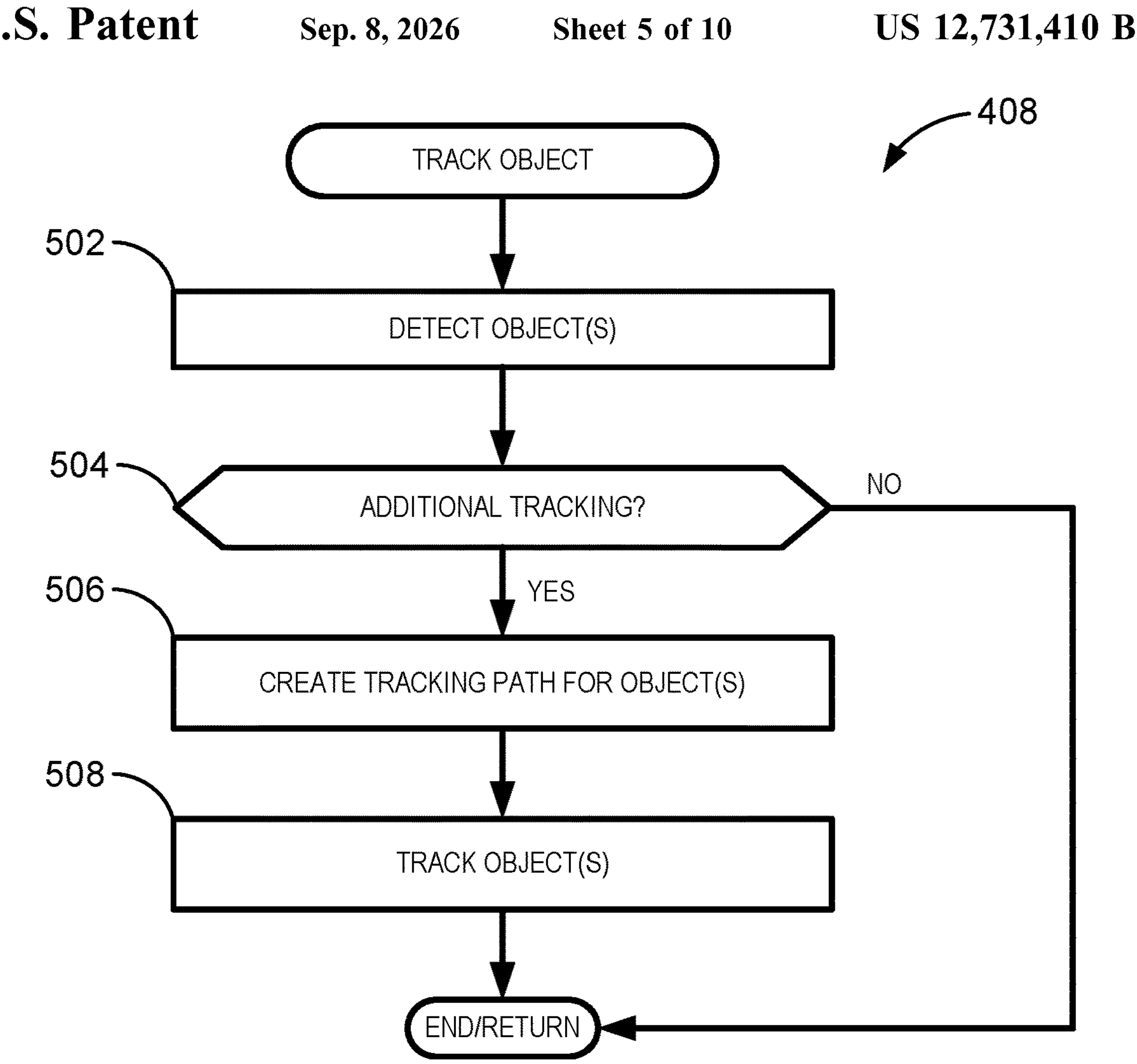
Figure 5B:
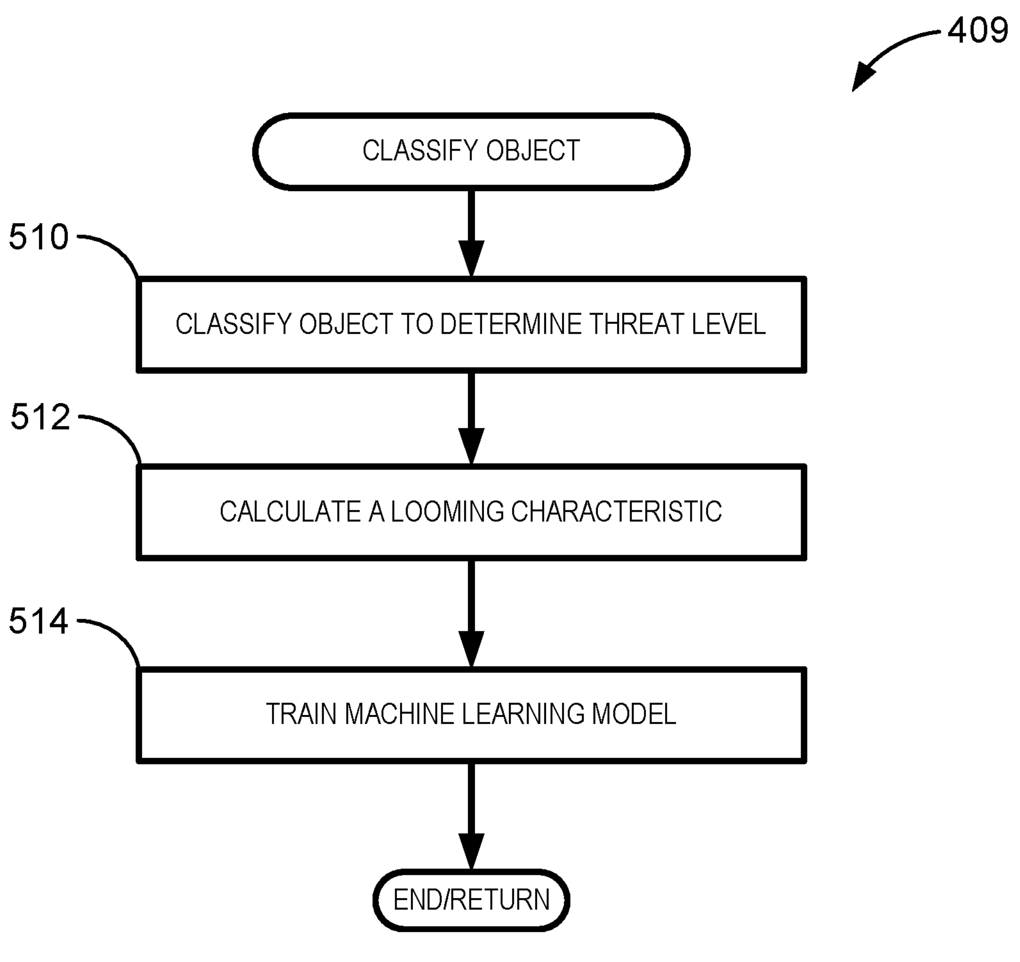
Figure 6:
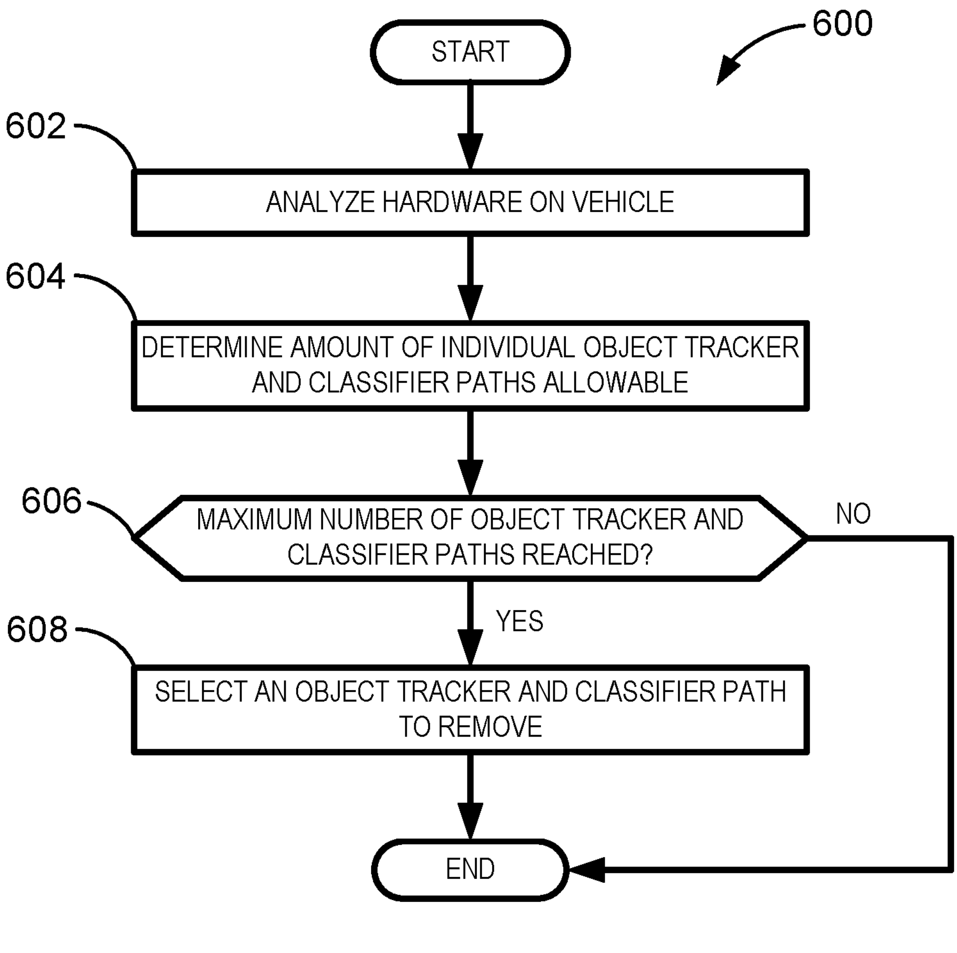

Flowchart(s) representative of example machine readable instructions, which may be executed by programmable circuitry to implement and/or instantiate the candidate identification circuitry 300 of FIG. 3 and/or representative of example operations which may be performed by programmable circuitry to implement and/or instantiate the candidate identification circuitry 300 of FIG. 3, are shown in FIGS. 4-6. The machine readable instructions may be one or more executable programs or portion(s) of one or more executable programs for execution by programmable circuitry such as the programmable circuitry 712 shown in the example processor platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 4-6, many other methods of implementing the example candidate identification circuitry 300 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, MATLAB, Perl, Python, JavaScript, HyperText Markup Language (HTML), Structured Query Language (SQL), Swift, CUDA, etc.

As mentioned above, the example operations of FIGS. 4-6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 4 is a flowchart representative of example machine readable instructions and/or example operations 400 that may be executed, instantiated, and/or performed by example programmable circuitry to implement the example candidate identification circuitry 300 of FIG. 3 and/or the example process flow 200 of FIG. 2. The example machine-readable instructions and/or the example operations 400 of FIG. 4 begin at block 402, at which the image/video from the image sensor 201 is stabilized by the example object detection circuitry 304. In some examples, the forces measured by the IMU 202 are utilized to stabilize the image/video.

At block 404, the stabilized camera image/video is pre-processed by the example object detection circuitry 304 to identify potential targets. In some examples, individual pixels are analyzed to determine whether potential targets/objects are present in the image/video. In some examples, potential targets are identified based on varying sizes of the targets/objects such as, but not limited to, single pixel, several pixels, and/or sub-pixel detection.

At block 406, the example object detection circuitry 304 filters the potential targets to determine whether the potential target is persistent in time. In some examples, the determination of whether the object is persistent in time is based on a persistence threshold (e.g., an amount of time an object must be in the video/images to be classified as a potential target). If the object is not persistent in time and does not meet the persistence threshold (e.g., block 406 returns a result of NO), the example operations 400 of FIG. 4 return to block 404 to pre-process a new set of stabilized images/video.

At block 408, if block 406 returns a result of YES (e.g., the object is persistent in time and exceeds the persistence threshold), the example object tracker circuitry 306 tracks the object. In some examples, the object tracker circuitry 306 tracks more than one object in a relatively simultaneous manner.

At block 409, the example object classifier circuitry 308 classifies the object being tracked. In some examples, the object classifier circuitry 308 classifies each tracked object in a relatively simultaneous manner (e.g., in substantially real-time).

At block 410, the example object detection circuitry 304 determines whether the object is to be re-filtered. In some examples, the object detection circuitry 304 determines that an object is no longer a threat to the UAV 104 and, thus, the object tracker circuitry 306 is not required to track and object classifier circuitry 308 no longer needs to classify the object. When the object detection circuitry 304 determines that the object is no longer a threat and is to be re-filtered (e.g., block 410 returns a result of YES), the object detection circuitry 304 can instruct and/or cause re-filtering of the object.

At block 412, when the example object detection circuitry 304 determines that the object is not to be re-filtered (e.g., block 410 returns a result of NO), an output is generated/provided/transmitted. In some examples, when the object has been deemed a threat, the output indicates as such and provided the output to a user and/or operator/pilot. In other examples, the output indicates that an object has been detected or that an object is no longer being detected that was previously being detected. In other examples, the output indicates that a threat/object was avoided due to an evasive maneuver that was performed by the UAV 104. It should be understood that this list of potential outputs/results is not comprehensive and may include additional indications that are not present in the examples provided herein.

FIG. 5A is a flowchart representative of example machine readable instructions and/or example operations that may be executed, instantiated, and/or performed by example programmable circuitry to track an object. The example of FIG. 5A represent example machine readable instructions and/or example operations to implement block 408 of FIG. 4. The example machine-readable instructions and/or the example operations of FIG. 5A begin at block 502, at which the object detection circuitry 304 detects a number of objects based on the threats detected. In some examples, the number of objects that can be detected is limited to hardware capabilities on the platform 100/UAV 104.

At block 504, the example object detection circuitry 304 determines whether each object requires additional tracking to determine a threat level of the objects. In some examples, the object detection circuitry 304 determines that some or all of the objects are not identified as a threat that justifies tracking and classifying. When the object detection circuitry 304 determines that an object does not necessitate tracking (e.g., block 504 returns a result of NO), the example operations of FIG. 5A end and return to the example operations 400 of FIG. 4 at the conclusion of the operations of block 408. Otherwise, the example operations of FIG. 5A proceeds to block 506.

At block 506, when the example object detection circuitry 304 determines that an object does require additional tracking (e.g., block 504 returns a result of YES), the example object detection circuitry 304 creates a tracking path for each object that requires additional tracking. In some examples, the object detection circuitry 304 generates a tracking path that is unique and independently operational for each object detected as a threat and allocates computational resources to track and classify each object independently.

At block 508, the example object tracker circuitry 306 tracks each object. In some examples, the tracking of each object includes collecting data on each object such as a persistence factor (e.g., how much time the object is in the image/video), whether the object is changing in size, etc.

FIG. 5B is a flowchart representative of example machine readable instructions and/or example operations that may be executed, instantiated, and/or performed by example programmable circuitry to classify an object. The example of FIG. 5B represent example machine readable instructions and/or example operations to implement block 409 of FIG. 4. The example machine-readable instructions and/or the example operations of FIG. 5B begin at block 510, at which the object classifier circuitry 308 classifies each object. In some examples, classifying each object includes determining a category to place the object in, calculating/determining a threat level for each object, etc. In examples disclosed herein, each object is independently classified.

In some examples, a machine learning model can be utilized to classify an object and calculate a threat level for the object. In such an example, the machine learning model can include data regarding relatively common objects for the application of the platform 100. Such data can include the types of objects typically detected, an initial threat level for typical objects, or any other form of information regarding common objects, etc. In some examples, the machine learning model can be updated using previously classified objects and previously calculated threat levels. In such an example, the machine learning model can learn which objects are typically detected and calculate threat levels relatively quicker.

At block 512, the example looming calculator circuitry 310 calculates looming characteristics for each object. In some examples, looming characteristics include a looming threshold, placing a weight (e.g., an importance/emergency factor) on the object based on a category of the object (e.g., a different weight may be assigned to a floating bag versus a bird or another vehicle), etc. In some examples, the looming characteristics are used to determine the output. In some examples, the looming calculator circuitry 310 calculates the looming characteristics based on a pixel detection methodology. In such examples, the looming characteristics can be calculated using a single pixel of information from an image/video in a relatively quick manner. In known systems, a blob detection methodology is utilized, which necessarily requires more information (e.g., where a blob is a cluster of pixels).

In some examples, at block 514, the example machine learning circuitry 312 trains a machine learning model based on data corresponding to tracking, classifying, and analyzing the objects. In some examples, the machine learning circuitry 312 trains the machine learning model based on the output and deploys the trained machine learning model to the example object detection circuitry 304, the example object tracker circuitry 306, the example object classifier circuitry 308, and/or the example looming calculator circuitry 310 to reduce subsequent detection, tracking, classifying, and calculating times that occur when a threat is detected.

Once the machine learning model is trained and/or deployed by the machine learning circuitry 312, the example operations of FIG. 5B end and return to the example operations 400 of FIG. 4 at the conclusion of the operations of block 409.

FIG. 6 is a flowchart representative of example machine readable instructions and/or example operations 600 that may be executed, instantiated, and/or performed by example programmable circuitry identify a maximum number of objects that can be detected, tracked, and classified by the candidate identification circuitry 300. The example machine-readable instructions and/or the example operations 600 of FIG. 6 begin at block 602, at which the hardware analyzer circuitry 314 analyzes the hardware on the vehicle/platform 100/UAV 104. In some examples, analyzing the hardware includes detecting computational resources such as CPU resources available, RAM available, GPU resources available, etc.

At block 604, the example hardware analyzer circuitry 314 determines the maximum number of individual tracking paths that can be created. In some examples, each tracking path allocates a similar amount (e.g., an identical amount) of computational resources to track and classify each object. In other examples, each tracking path is individually allocated such that some objects utilize less computational resources to track and classify. In such an example, the example hardware analyzer circuitry 314 can determine the maximum number of tracking paths by monitoring the amount of computing resources available with the computing resources required to track and classify an individual object.

At block 606, the example hardware analyzer circuitry 314 can determine substantially in real time whether the maximum number of tracking paths have been reached. In some examples, the example hardware analyzer circuitry 314 monitors the operation of the tracking paths to determine whether the maximum number has been reached. In some examples, tracking paths are continually added and removed as objects are identified and removed as threats to the platform 100.

At block 608, when the hardware analyzer circuitry 314 determines that the maximum number of tracker and classifier paths have been created (e.g., block 606 returns a result of YES), the example hardware analyzer circuitry 314 selects a tracking path to remove. In some examples, the determination of which tracking path to remove is based on a threat level of each object and/or the looming characteristics of each object. In some examples, objects with the lowest threat levels and/or the least likely to exceed the looming thresholds are removed along with that object's tracking path.

When the example hardware analyzer circuitry 314 has selected a tracking path to remove (e.g., block 608 completed) or when the example hardware analyzer circuitry 314 determines that the maximum number of tracking paths has not been reached, the example operations 600 of FIG. 6 end.

Figure 7:
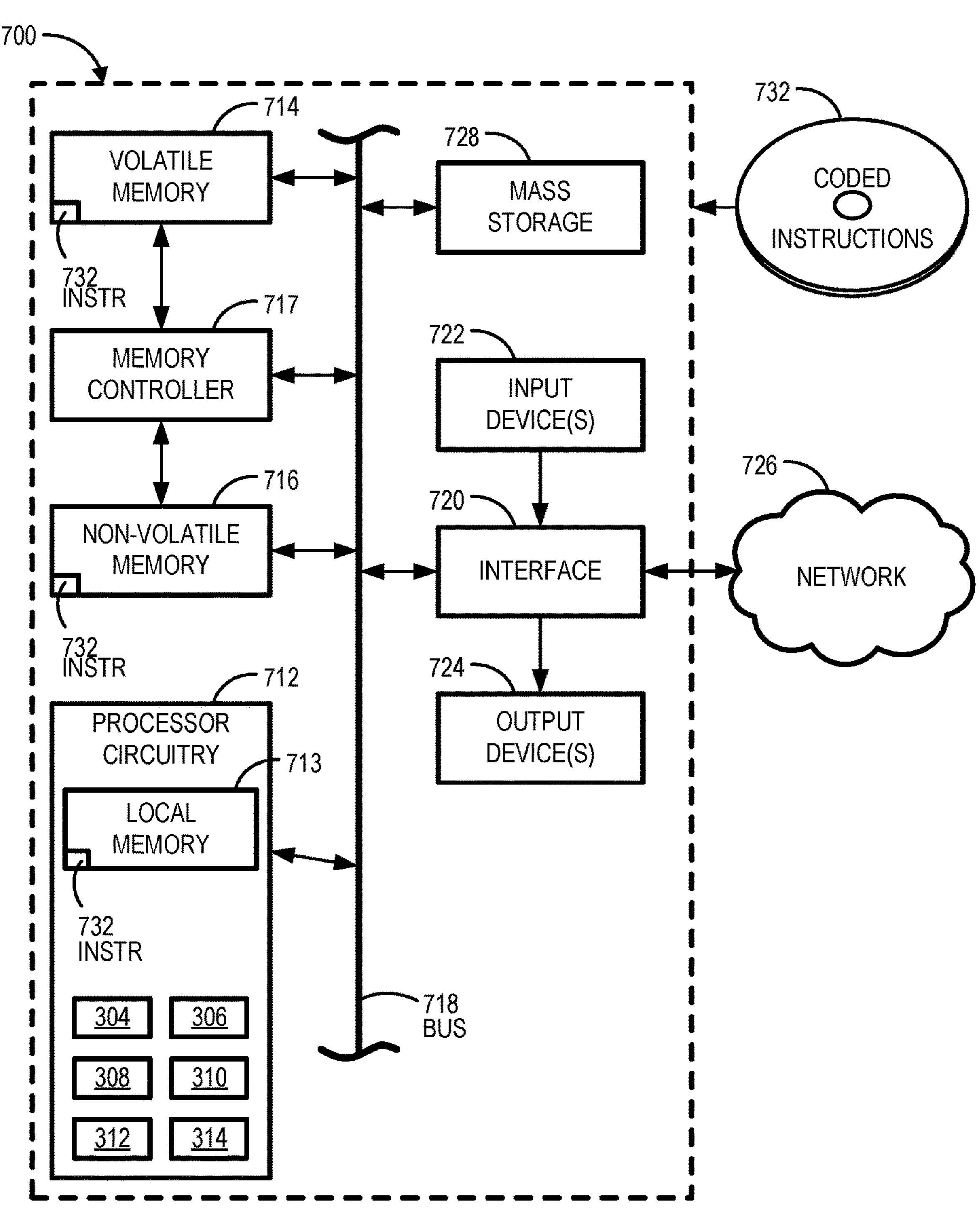
FIG. 7 is a block diagram of an example processing platform including programmable circuitry structured to execute, instantiate, and/or perform the example machine readable instructions and/or perform the example operations of FIGS. 4-6 to implement the candidate identification circuitry of FIG. 3.

FIG. 7 is a block diagram of an example programmable circuitry platform 700 structured to execute and/or instantiate the example machine-readable instructions and/or the example operations of FIGS. 4-6 to implement the candidate identification circuitry 300 of FIG. 3. The programmable circuitry platform 700 can be, for example, a remote computer system (e.g., remote control (RC) device), a server, a personal computer, a workstation, a self-learning machine (e.g., a neural network), a mobile device (e.g., a cell phone, a smart phone, a tablet such as an iPad™), or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements object detection circuitry 304, object tracker circuitry 306, object classifier circuitry 308, looming calculator circuitry 310, machine learning circuitry 312, and hardware analyzer circuitry 314.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, an Inter-Integrated Circuit (I2C) bus, a Serial Peripheral Interface (SPI) bus, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, a transponder, a receiver, an audio sensor, a visual sensor, a camera (still or video), or any other type of sensor or input device to sense operating conditions and/or receive commands.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a transponder, a transmitter, or any other type of device to transmit data and/or commands. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 4-6, may be stored in the mass storage device 728, in the volatile memory 714, in the non-volatile memory 716, and/or on at least one non-transitory computer readable storage medium such as a CD or DVD which may be removable.

Figure 8:
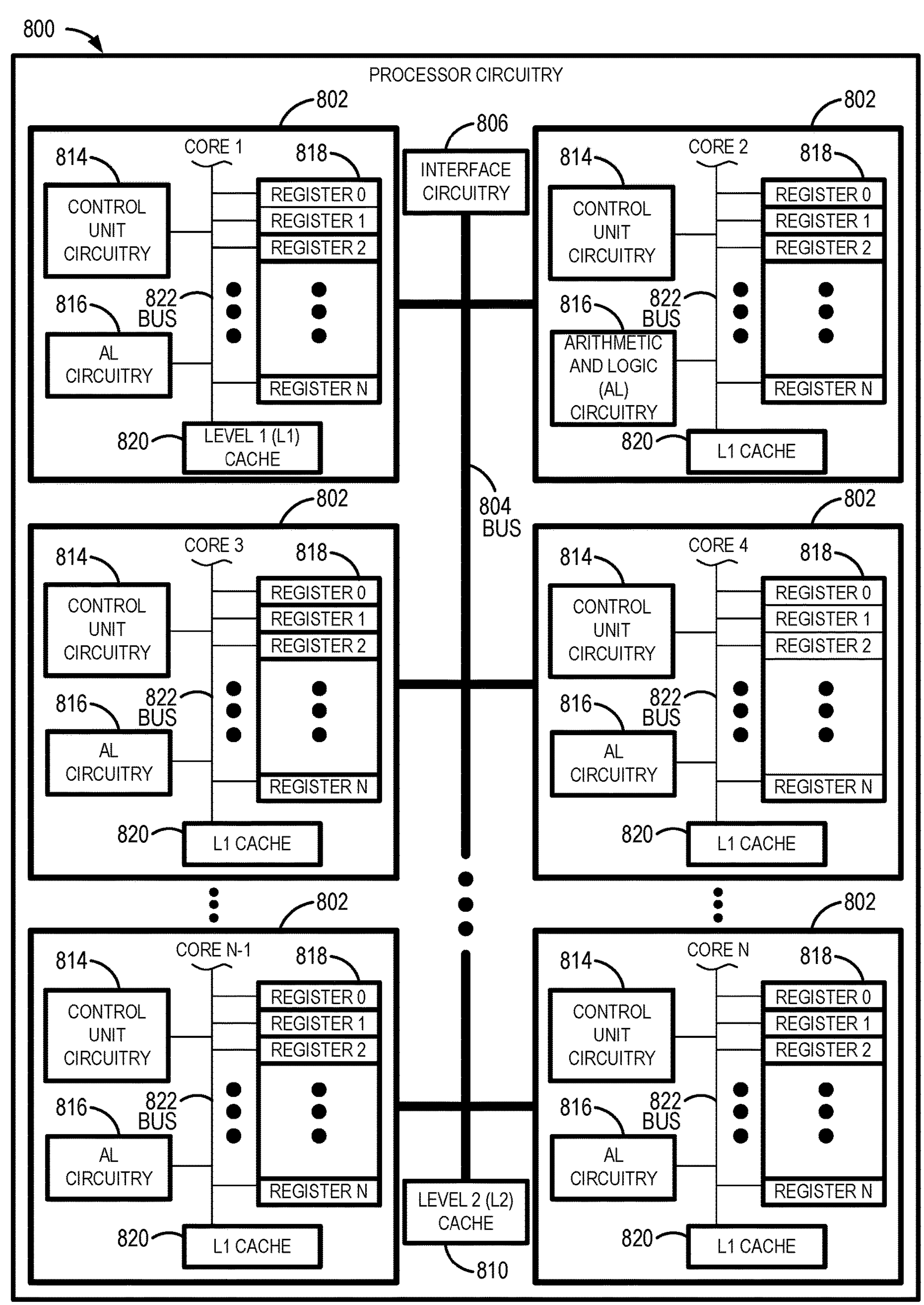
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 4-6 to effectively instantiate the circuitry of FIG. 3 as logic circuits to perform operations corresponding to those machine readable instructions. In some such examples, the circuitry of FIG. 3 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
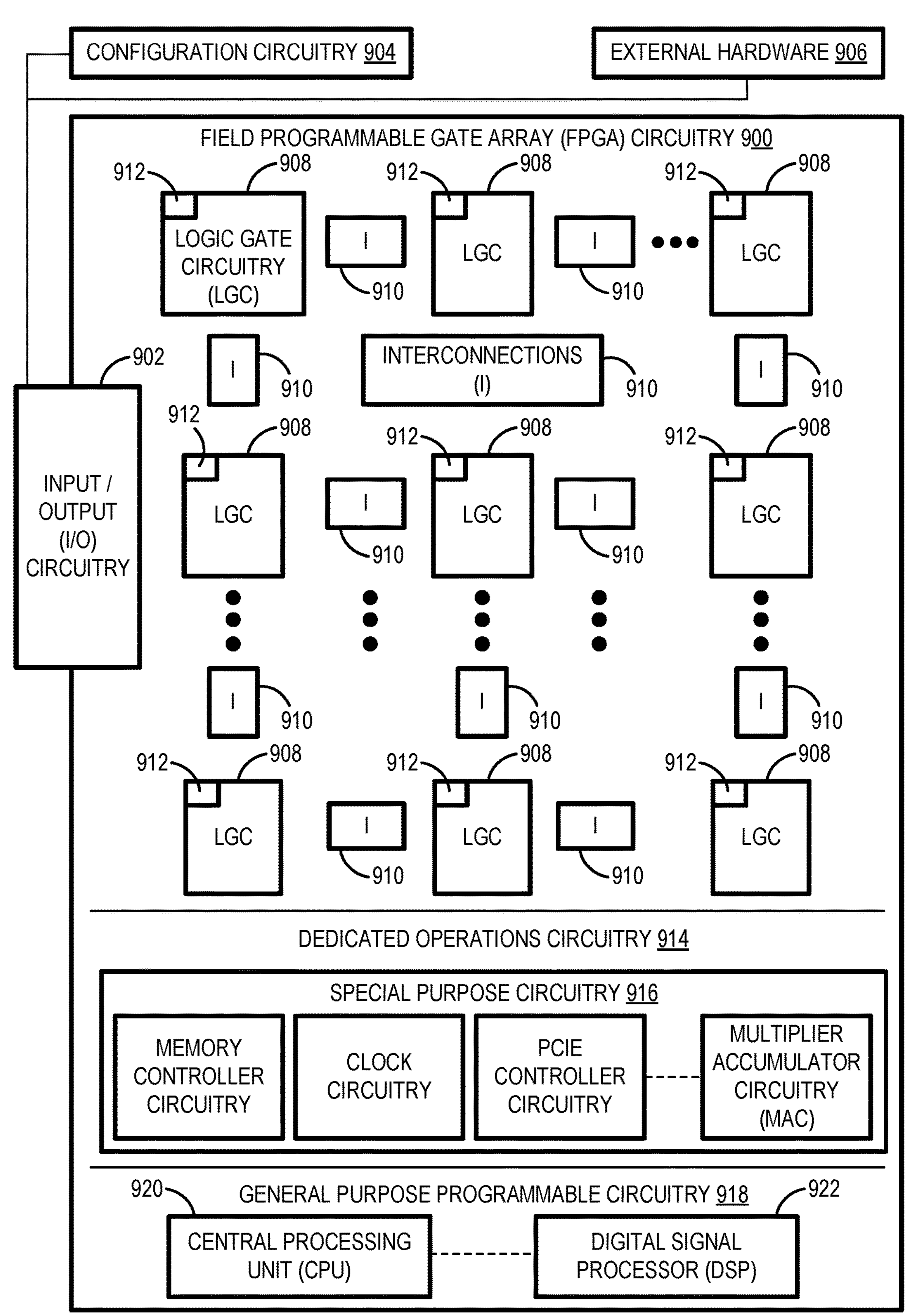
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart(s) of FIGS. 4-6 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4-6. As such, the FPGA circuitry 900 may be configured and/or structured to effectively instantiate some or all of the operations/functions corresponding to the machine readable instructions of the flowchart(s) of FIGS. 4-6 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIGS. 4-6 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIGS. 4-6 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 4-6 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 4-6, and/or an ASIC may be configured and/or structured to perform third operation(s)/function(s) corresponding to a third portion of the machine readable instructions represented by the flowcharts of FIGS. 4-6.

It should be understood that some or all of the circuitry of FIG. 3 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 3 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

From the foregoing, it will be appreciated that example systems, apparatus, articles of manufacture, and methods can enable an image sensor system to efficiently track and classify objects. Disclosed systems, apparatus, articles of manufacture, and methods improve the efficiency of using a computing device by creating unique tracker and classifier paths to simultaneously track and classify multiple objects, allowing more objects to be detected and avoided without relying on the objects to include communication systems and without utilizing costly and heavy object detection systems such as radar. Additionally, disclosed systems, apparatus, articles of manufacture, and methods reduce computational requirements needed to track and classify multiple objects by calculating looming characteristics for each object detected in relatively real-time, which allows each object being tracked and classified to utilize a different amount of (e.g., some using less) computational resources. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture for tracking and classifying objects are disclosed herein. Further examples and combinations thereof include the following:

Example 1 includes an apparatus for use with an aircraft, the apparatus comprising interface circuitry communicatively coupled to an image sensor, the image sensor to capture images, machine readable instructions, and programmable circuitry to at least one of instantiate or execute the machine readable instructions to pre-process the images to identify potential targets, filter, based on the identified potential targets, at least one of the images to determine a presence of a persistent object therein, characterize a looming characteristic of the persistent object, and classify the persistent object based on the looming characteristic meeting or exceeding a looming characteristic threshold.

Example 2 includes the apparatus of example 1, wherein the programmable circuitry is to determine a threat level of the persistent object based on the looming characteristic.

Example 3 includes the apparatus of example 1, wherein the programmable circuitry is to modify the looming characteristic threshold based on at least one of a size or a location of the persistent object.

Example 4 includes the apparatus of example 1, wherein the programmable circuitry is to track the persistent object, the programmable circuitry to characterize the looming characteristic in response to the tracking of the persistent object.

Example 5 includes the apparatus of example 1, wherein the programmable circuitry is to classify the persistent object via a machine learning model, the machine learning model trained with classification information of known objects.

Example 6 includes the apparatus of example 5, wherein the programmable circuitry is to characterize the persistent object based on the looming characteristic, and train the machine learning model in response to characterizing the persistent object.

Example 7 includes the apparatus of example 1, wherein the programmable circuitry is to determine a persistence of the persistent object based on an object size being one pixel.

Example 8 includes the apparatus of example 1, wherein the programmable circuitry is to determine a persistence of the persistent object based on a rate of change of an object size.

Example 9 includes a non-transitory machine readable storage medium comprising instructions to cause programmable circuitry to at least pre-process an image to identify potential targets, filter, based on the identified potential targets, at least one of the images to determine a presence of a persistent object therein, characterize a looming characteristic of the persistent object, and classify the persistent object based on the looming characteristic meeting or exceeding a looming characteristic threshold.

Example 10 includes the non-transitory machine readable storage medium of example 9, wherein the instructions cause the programmable circuitry to determine a threat level of the persistent object based on the looming characteristic.

Example 11 includes the non-transitory machine readable storage medium of example 9, wherein the instructions cause the programmable circuitry to modify the looming characteristic threshold based on at least one of a size or a location of the persistent object.

Example 12 includes the non-transitory machine readable storage medium of example 9, wherein the instructions cause the programmable circuitry to track the persistent object, wherein the looming characteristic is characterized in response to the tracking of the persistent object.

Example 13 includes the non-transitory machine readable storage medium of example 9, wherein the instructions cause the programmable circuitry to classify the persistent object via a machine learning model, the machine learning model trained with classification information of known objects.

Example 14 includes the non-transitory machine readable storage medium of example 13, wherein the instructions cause the programmable circuitry to characterize the persistent object based on the looming characteristic, and train the machine learning model in response to characterizing the persistent object.

Example 15 includes the non-transitory machine readable storage medium of example 9, wherein the instructions cause the programmable circuitry to determine a persistence of the persistent object based on an object size being one pixel.

Example 16 includes the non-transitory machine readable storage medium of example 9, wherein the instructions cause the programmable circuitry to determine a persistence of the persistent object based on a rate of change of an object size.

Example 17 includes a method comprising pre-processing, by executing instructions with processor circuitry, an image to identify potential targets, filtering, by executing instructions with the processor circuitry, at least one of the images based on the identified potential targets to determine a presence of a persistent object therein, characterizing, by executing instructions with the processor circuitry, a looming characteristic of the persistent object, and classifying, by executing instructions with the processor circuitry, the persistent object based on the looming characteristic meeting or exceeding a looming characteristic threshold.

Example 18 includes the method of example 17, further including determining, by executing instructions with the processor circuitry, a threat level of the persistent object based on the looming characteristic.

Example 19 includes the method of example 17, further including tracking, by executing instructions with the processor circuitry, the persistent object, the characterizing of the looming characteristic in response to the tracking of the persistent object.

Example 20 includes the method of example 17, wherein classifying of the persistent object is performed via a machine learning model, the machine learning model trained with classification information of known objects.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus for use with an aircraft, the apparatus comprising:

interface circuitry communicatively coupled to an image sensor, the image sensor to capture images;

machine readable instructions; and programmable circuitry to at least one of instantiate or execute the machine readable instructions to:

pre-process the images to identify potential targets;

filter, based on the identified potential targets, at least one of the images to determine a presence of a persistent object therein;

characterize a looming characteristic of the persistent object, the looming characteristic corresponding to the persistent object maintaining a relatively constant bearing; and classify the persistent object as point-like based on the looming characteristic meeting or exceeding a looming characteristic threshold.

2. The apparatus of claim 1, wherein the programmable circuitry is to determine a threat level of the persistent object based on the looming characteristic.

3. The apparatus of claim 1, wherein the programmable circuitry is to modify the looming characteristic threshold based on at least one of a size or a location of the persistent object.

4. The apparatus of claim 1, wherein the programmable circuitry is to track the persistent object, the programmable circuitry to characterize the looming characteristic in response to the tracking of the persistent object.

5. The apparatus of claim 1, wherein the programmable circuitry is to classify the persistent object via a machine learning model, the machine learning model trained with classification information of known objects.

6. The apparatus of claim 5, wherein the programmable circuitry is to:
- characterize the persistent object based on the looming characteristic; and
- train the machine learning model in response to characterizing the persistent object.

7. The apparatus of claim 1, wherein the programmable circuitry is to determine a persistence of the persistent object based on an object size being one pixel.

8. The apparatus of claim 1, wherein the programmable circuitry is to determine a persistence of the persistent object based on a rate of change of an object size.

9. The apparatus of claim 1, wherein the programmable circuitry is to perform image pre-processing to reduce an object size of the persistent object to a single pixel to reduce computational requirements.

10. The apparatus of claim 9, wherein the object size is reduced by converting a cluster of pixels corresponding to the persistent object to the single pixel to reduce a time to identify the potential targets.

11. The apparatus of claim 1, wherein the looming characteristic includes a change in size of the persistent object.

12. A non-transitory machine readable storage medium comprising instructions to cause programmable circuitry to at least:
- pre-process an image to identify potential targets;
- filter, based on the identified potential targets, at least one of the images to determine a presence of a persistent object therein;
- characterize a looming characteristic of the persistent object, the looming characteristic corresponding to the persistent object maintaining a relatively constant bearing; and
- classify the persistent object as point-like based on the looming characteristic meeting or exceeding a looming characteristic threshold.

13. The non-transitory machine readable storage medium of claim 12, wherein the instructions cause the programmable circuitry to determine a threat level of the persistent object based on the looming characteristic.

14. The non-transitory machine readable storage medium of claim 12, wherein the instructions cause the programmable circuitry to modify the looming characteristic threshold based on at least one of a size or a location of the persistent object.

15. The non-transitory machine readable storage medium of claim 12, wherein the instructions cause the programmable circuitry to track the persistent object, wherein the looming characteristic is characterized in response to the tracking of the persistent object.

16. The non-transitory machine readable storage medium of claim 12, wherein the instructions cause the programmable circuitry to classify the persistent object via a machine learning model, the machine learning model trained with classification information of known objects.

17. The non-transitory machine readable storage medium of claim 16, wherein the instructions cause the programmable circuitry to:
- characterize the persistent object based on the looming characteristic; and
- train the machine learning model in response to characterizing the persistent object.

18. The non-transitory machine readable storage medium of claim 12, wherein the instructions cause the programmable circuitry to determine a persistence of the persistent object based on an object size being one pixel.

19. The non-transitory machine readable storage medium of claim 12, wherein the instructions cause the programmable circuitry to determine a persistence of the persistent object based on a rate of change of an object size.

20. A method comprising:
- pre-processing, by executing instructions with processor circuitry, an image to identify potential targets;
- filtering, by executing instructions with the processor circuitry, at least one of the images based on the identified potential targets to determine a presence of a persistent object therein;
- characterizing, by executing instructions with the processor circuitry, a looming characteristic of the persistent object, the looming characteristic corresponding to the persistent object maintaining a relatively constant bearing; and
- classifying, by executing instructions with the processor circuitry, the persistent object as point-like based on the looming characteristic meeting or exceeding a looming characteristic threshold.

21. The method of claim 20, further including determining, by executing instructions with the processor circuitry, a threat level of the persistent object based on the looming characteristic.

22. The method of claim 20, further including tracking, by executing instructions with the processor circuitry, the persistent object, the characterizing of the looming characteristic in response to the tracking of the persistent object.

23. The method of claim 20, wherein classifying of the persistent object is performed via a machine learning model, the machine learning model trained with classification information of known objects.

* * * * *